United States Patent
Su

(10) Patent No.: US 10,063,103 B2
(45) Date of Patent: Aug. 28, 2018

(54) CONTACTLESS POWER TRANSMISSION DEVICE AND POWER TRANSMISSION METHOD THEREOF

(71) Applicant: Ningbo WeiE Electronic Technology Co., Ltd, Zhenhai, Ningbo (CN)

(72) Inventor: Hengyi Su, Ningbo (CN)

(73) Assignee: Ningbo WeiE Electronic Technology Co., Ltd, Zhenhai (CN)

( * ) Notice: Subject to any disclaimer, the term of this patent is extended or adjusted under 35 U.S.C. 154(b) by 268 days.

(21) Appl. No.: 15/198,092

(22) Filed: Jun. 30, 2016

(65) Prior Publication Data

US 2017/0033612 A1    Feb. 2, 2017

(30) Foreign Application Priority Data

Jul. 2, 2015 (CN) .......................... 2015 1 0393831
Jul. 2, 2015 (CN) ...................... 2015 2 0481100 U

(51) Int. Cl.
*H01F 27/42* (2006.01)
*H02J 50/12* (2016.01)
*H02H 9/04* (2006.01)

(52) U.S. Cl.
CPC ............... *H02J 50/12* (2016.02); *H02H 9/04* (2013.01)

(58) Field of Classification Search
CPC .................................. H02J 50/12; H02H 9/04
See application file for complete search history.

(56) References Cited

U.S. PATENT DOCUMENTS

| | | | | |
|---|---|---|---|---|
| 2012/0293009 A1* | 11/2012 | Kim | ..................... | H02H 7/1252 |
| | | | | 307/104 |
| 2014/0063666 A1* | 3/2014 | Kallal | .................. | H02J 7/0029 |
| | | | | 361/56 |
| 2015/0372496 A1* | 12/2015 | Lee | ........................ | H02J 50/40 |
| | | | | 307/104 |
| 2016/0254679 A1* | 9/2016 | Liu | ........................ | H02J 50/12 |
| | | | | 307/104 |
| 2017/0104368 A1* | 4/2017 | Radke | ..................... | H02J 50/12 |
| 2017/0126066 A1* | 5/2017 | Von Novak, III | ...... | H02J 50/12 |

* cited by examiner

*Primary Examiner* — Jared Fureman
*Assistant Examiner* — Duc M Pham
(74) *Attorney, Agent, or Firm* — Gearhart Law LLC

(57) ABSTRACT

A contactless power transmission device and a power transmission method are disclosed herein. When a rectifier filter circuit receives high-frequency AC output from receiving coil and after a full-bridge rectifying and filtering process, DC voltage signal is obtained. When the DC voltage after rectifying and filtering is detected to exceed the preset value, a current loop is formed using a switch protection circuit, an impedance matching circuit and a receiving coil, to transfer the energy of receiving coil until the voltage drop to no higher than the preset value. Of which, the switch protection circuit is connected between the impedance matching network and ground, when the power transmission device is in normal working, the switch protection circuit does not work; when an overvoltage occurs, the switch protection circuit can switch on/off, to reduce the value of DC voltage.

18 Claims, 5 Drawing Sheets

CONTACTLESS POWER TRANSMISSION DEVICE AND POWER TRANSMISSION METHOD THEREOF

CLAIM OF PRIORITY

This application claims the priority benefit of Chinese Patent Applications Nos. 201510393831.4 and 201520481100.0, both filed on Jul. 2, 2015, the contents of which are hereby incorporated by reference into this application.

FIELD OF THE EMBODIMENTS

This invention relates to the wireless charging field, and more specifically, to a contactless power transmission device and a power transmission method.

BACKGROUND OF THE EMBODIMENTS

The contactless power transmission technology (also called wireless power transmission technology) is widely used in electronic charging field with its advantage of safety and convenience. There are two ways to achieve wireless power transmission: magnetic induction and magnetic resonance. Normally the magnetic resonance way is used. The magnetic-resonance wireless power transmission device mainly includes a transmitting portion and a receiving portion, both can achieve energy transmission according to the electromagnetic resonance principle.

Generally, the transmitting portion includes an inverter, an impedance matching circuit and a transmitting coil. The receiving portion includes a receiving coil, an impedance matching circuit, and a rectifying circuit (taking a full-bridge rectifier as an example) and a DC voltage conversion circuit (DC-DC converter).

As shown in FIG. 1, the transmitting portion of the contactless power transmission device only indicates a transmitting coil. The transmitting coil LS receives alternating current to generate alternating magnetic field with frequency of $\omega 0$, after the receiving coil Ld induces the alternating voltage $V\sin(\omega 0)$ with frequency of $w\omega 0$, through the rectification of full bridge rectifier circuit and filter capacitor C compensation, the alternating voltage Vsin is converted to DC voltage Vrect.

When coupling of receiving coil Ld and transmitting coil LS, the alternating voltage amplitude induced from the receiving coil is high; and when poor coupling, the alternating voltage amplitude induced from the receiving coil is low. Therefore, in order to induce the maximum amplitude of DC voltage Vrect at the receiving terminal, the resonant frequency of the capacitor C and the inductance L of the coil at the receiving terminal is set at the frequency $\omega 0$.

However, in the power transmission process, the coupling of the transmitting coil and the receiving coil may change, such as a sudden increase in coupling or a sudden increase in magnetic field energy in the transmitting coil, which will cause DC voltage Vrect to exceed the preset value after full bridge rectifier circuit. The excessive voltage may damage to post-stage DC-DC converter, and even damage to the electronic device on the load side.

SUMMARY OF THE EMBODIMENTS

In the present patent application, a contactless power transmission device and a power transmission method are disclosed. When a DC voltage after rectifying and filtering is detected to exceed a preset voltage value, a loop is formed using a switch protection circuit, a part of impedance matching network and a receiving coil, so that the energy of receiving coil will not flow to a post-stage rectifier bridge circuit until the DC voltage recovers to no higher than the preset voltage value.

According to one aspect of the patent application, a contactless power transmission device is provided. The contactless power transmission device includes a transmitting portion; and a receiving portion. The transmitting portion and the receiving portion are isolated. The transmitting portion comprises a transmitting coil for emitting energy. The receiving portion comprises a receiving coil for receiving energy, an impedance matching network, a rectifier filter circuit and a voltage conversion circuit connected to the receiving coil sequentially. The receiving portion further comprises a switch protection circuit and an overvoltage control circuit. The impedance matching network comprises a first impedance circuit and a second impedance circuit, the first impedance circuit and the second impedance circuit are connected between a first end of the receiving coil and the rectifier filter circuit. The rectifier filter circuit receives the high-frequency AC output from the receiving coil, to obtain a DC voltage signal. The switch protection circuit comprises a first switch and a second switch, a first polarity terminal of the first switch is connected to a common connection point of the first impedance circuit and the second impedance circuit, a second polarity terminal first switch is connected to a ground, a first polarity terminal of the second switch is connected to the a common connection point of a second end of the receiving coil and the rectifier filter circuit, and a second polarity terminal second switch is connected to the ground.

The overvoltage control circuit receives the DC voltage signal and a reference voltage signal, to generate a switching control signal for controlling an on/off state of the first switch and the second switch, so that the DC voltage signal does not exceed a preset voltage value. Optional, the rectifier filter circuit comprises a full bridge rectifier circuit and a filter capacitor. The full bridge rectifier circuit receives high-frequency AC of the receiving coil, to convert to a half-sinusoid voltage signal. The filter capacitor receives the half-sinusoid voltage signal, to obtain a DC voltage signal.

Optional, the full bridge rectifier circuit comprises a first diode and a second diode connected in series and a third diode and a fourth diode connected in series. The two pairs of diodes connected in series are connected in parallel. A common connection terminal of the first diode and the third diode outputs the half-sinusoid voltage signal. A common connection terminal of the second diode and the fourth diode is connected to the ground.

The second impedance circuit is connected to a common connection point of the first diode and the second diode.

Optional, the impedance matching network further comprises a third impedance circuit. The third impedance circuit is connected in series between the second end of the receiving coil and the rectifier filter circuit; and the first polarity terminal of the second switch is connected to a common connection point of the second end of the receiving coil and the third impedance circuit. Optional, the third impedance circuit is connected to a common connection point of the third diode and the fourth diode.

Optional, the overvoltage control circuit specifically comprises a sampling circuit and a hysteresis comparator. The sampling circuit samples the DC voltage signal, to obtain a sampling voltage signal. The hysteresis comparator receives the sampling voltage signal and the reference voltage signal representing the preset voltage value, and outputs the switching control signal. When the sampling voltage signal is greater than an upper limit of voltage of the hysteresis comparator, the switching control signal is in an active state to control the first switch and the second switch to switch on simultaneously. When the sampling voltage signal is less than a lower limit of voltage of the hysteresis comparator, the switching control signal is in an inactive state to control the first switch and the second switch to switch off simultaneously.

Optional, the first impedance circuit and second impedance circuit are a first capacitor and a second capacitor respectively. During a normal operation of the contactless power transmission device, an equivalent capacitance of the first capacitor and second capacitor connected in series is resonant with an equivalent inductance of the receiving coil, and a resonant frequency of the equivalent capacitance and the equivalent inductance is consistent with an operating frequency of the system.

Optional, the first impedance circuit, second impedance circuit and third impedance circuit are a first capacitor, a second capacitor and a third capacitor respectively. During a normal operation of the contactless power transmission device, an equivalent capacitance of the first capacitor, the second capacitor and third capacitor connected in series is resonant with an equivalent inductance of the receiving coil, and a resonant frequency of the equivalent capacitance and the equivalent inductance is consistent with an operating frequency of the system.

Optional, the voltage conversion circuit receives a DC voltage signal transmitted from rectifier filter circuit, and outputs an appropriate voltage to an electronic device by converting a DC voltage.

Optional, both the first switch and the second switch are field-effect transistors. According to another aspect of the patent application, a contactless power transmission method is provided. The method is applied to a contactless power transmission device. The contactless power transmission device comprises a transmitting portion and a receiving portion isolated, the transmitting portion comprises a transmitting coil for emitting energy, the receiving portion comprises a receiving coil for receiving energy, an impedance matching network, and a rectifier filter circuit connected to the receiving coil sequentially.

The method includes: receiving a high-frequency AC output from the receiving coil, to obtain a DC voltage signal; and detecting a value of the DC voltage signal. When the DC voltage signal is greater than a preset voltage value, controlling an energy of a receiving coil via a switch protection circuit composed of the first switch and the second switch, so that the energy will not flow to a rectifier filter circuit until the DC voltage signal does not exceed the preset voltage value.

The impedance matching network comprises a first impedance circuit and a second impedance circuit. The first impedance circuit and the second impedance circuit are connected in series between a first end of the receiving coil and the rectifier filter circuit. A first polarity terminal of the first switch is connected to a common connection point of the first impedance circuit and the second impedance circuit. A second polarity terminal of the first switch is connected to a ground. A first polarity terminal of the second switch is connected to the a common connection point of a second end of the receiving coil and the rectifier filter circuit, and a second polarity terminal of the second switch is connected to the ground. Optional, the impedance matching network further comprises a third impedance circuit. The third impedance circuit is connected in series between the second end of the receiving coil and the rectifier filter circuit. The first polarity terminal of the second switch is connected to a common connection point of the second end of the receiving coil and the third impedance circuit. Optional, an on/off operation of the first switch and the second switch is controlled by a switching control signal. The switching control signal is generated by: sampling a DC voltage signal, to obtain a sampling voltage signal; and receiving the sampling voltage signal and a reference voltage signal representing the preset voltage value, performing hysteresis comparison, to output the switching control signal.

When the sampling voltage signal is greater than an upper limit of voltage of the hysteresis comparator, the switching control signal is in an active state to control simultaneous switching-on of the first switch and the second switch. When the sampling voltage signal is less than a lower limit of voltage of the hysteresis comparator, the switching control signal is in an inactive state to control the simultaneous switching-off of the first switch and the second switch. Optional, the rectifier filter circuit comprises a full bridge rectifier circuit and a filter capacitor. The full bridge rectifier circuit receives high-frequency AC of the receiving coil, to convert to a half-sinusoid voltage signal. The filter capacitor receives the half-sinusoid voltage signal, to obtain a DC voltage signal.

Optional, an equivalent capacitance of the impedance matching network is resonant with a equivalent inductance of the receiving coil, and a resonant frequency is consistent with an operating frequency of the system, during a normal operation of the contactless power transmission device.

Through the above contactless power transmission device and transmission method, the rectifier filter circuit receives the high-frequency AC output from the receiving coil, to obtain a DC voltage signal after full-bridge rectifier and filtering. The DC voltage signal is supplied to the electronic device after DC voltage conversion. When the DC voltage after rectifying and filtering is detected to exceed the preset voltage value, a current loop is formed using a switch protection circuit, a first impedance circuit and a receiving coil, so that the energy of receiving coil will not flow to a rectifier bridge until the DC voltage recovers to no higher than the preset voltage value. The switch protection circuit is connected between the impedance matching network and the ground. During a normal operation of the power transmission device, the switch protection circuit does not work. When an overvoltage occurs, the switch protection circuit can switch on/off, to reduce the value of DC voltage. The technical solutions in the patent application can solve the overvoltage problem under the condition of full-bridge rectifier, and it is easy to control, with good effect.

DESCRIPTION OF THE PREFERRED EMBODIMENTS

The patent application is described in details in combination with drawings and several preferred embodiments, but the patent application is no limited to these embodiments. Any alternatives, modifications, equivalents methods and schemes made within the essence and scope of the patent application shall fall within the scope of protection herein. In order to enable the public to have a thorough understanding of the patent application, specific details are described in the preferred embodiments herein, but those skilled in the art can fully understand the patent application without the description about these details.

Figure 1:
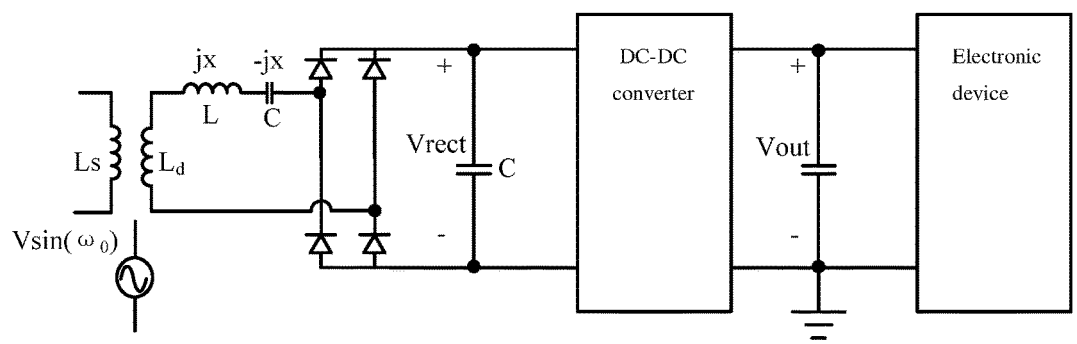
FIG. 1 illustrates a basic circuit block diagram of a contactless power transmission device.
Figure 2:
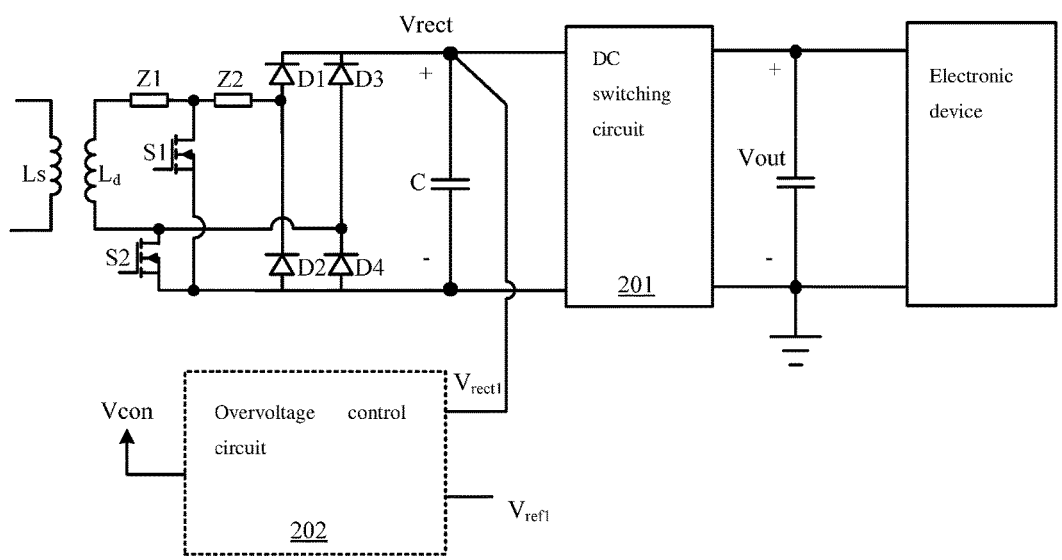
FIG. 2 illustrates a circuit block diagram of a contactless power transmission device according to a first embodiment of the patent application.

FIG. 2 is a circuit block diagram of a contactless power transmission device according a first embodiment of the patent application. As shown in FIG. 2, the contactless power transmission device includes a transmitting portion and a receiving portion isolated. The transmitting portion includes an inverter (not shown), an impedance matching network (not shown) and a transmitting coil LS for emitting energy; the receiving portion includes a receiving coil Ld for receiving energy and an impedance matching network, a rectifier filter circuit and a DC switching circuit 201 connected to the receiving coil sequentially. The rectifier filter circuit receives the high-frequency AC output from the receiving coil, to obtain a DC voltage signal Vrect, the DC switching circuit 201 receives the DC voltage signal Vrect, outputs appropriate voltage after voltage conversion and supplies to the electronic device.

Specifically, in this embodiment, the rectifier filter circuit includes a full bridge rectifier circuit and a filter capacitor C. The full bridge rectifier circuit receives high-frequency AC of the receiving coil, to convert to half-sinusoid voltage signal. The filter capacitor receives the half-sinusoid voltage signal, to obtain DC voltage signal. Specifically, as shown in FIG. 2, the full bridge rectifier circuit includes a first diode D1 and a second diode D2 connected in series, and a third diode D3 and a fourth diode D4 connected in series. The two pairs of diodes connected in series are connected in parallel. The common connection terminal of the first diode D1 and the third diode D3 outputs the half-sinusoid voltage signal. The common connection terminal of the second diode D2 and the fourth diode D4 is connected to the ground.

Referring to FIG. 2, the impedance matching network includes a first impedance circuit and a second impedance circuit. The first impedance circuit Z1 and the second impedance circuit are connected in series between the first end of the receiving coil and a rectifier filter circuit. Here, an upper end of the receiving coil is the first end, and a down end of the receiving coil is the second end. However, the first end can be the down end, and the second end can be the upper end. In the present patent application, the firs end and the second end are not used to limit the output end of the receiving coil.

The equivalent capacitance of the first impedance circuit and the second impedance circuit is resonant with the equivalent inductance of the receiving coil, and the resonant frequency is consistent with the operating frequency of the system.

Further, the switch protection circuit includes a first switch S1 and a second switch S2, FIG. as shown in FIG. 2, the first polarity terminal of the first switch S1 is connected to the common connection point of the first impedance circuit Z1 and the second impedance circuit Z2, and the second polarity terminal is grounded. The first polarity terminal of the second switch S2 is connected to the common connection point of the second end of the receiving coil and the rectifier filter circuit, and the second polarity terminal is grounded. In FIG. 2, for the first switch S1 and the second switch S2, taking field-effect transistors as example, since the second polarity terminals (that is, source) of the first switch and the second switch are grounded, and commonly grounded with the post-stage voltage conversion circuit and electronic device, the source voltage is stable and easy to drive. It is easily understood that, the first switch S1 and the second switch S2 are not limited to the above-mentioned field-effect transistors, which can be appropriate switching tubes such as single-pole double-throw switches, and etc.

Further referring to FIG. 2, the on/off state of the first switch S1 and the second switch S2 is controlled by overvoltage control circuit 202. The overvoltage control circuit 202 receives DC voltage signal Vrect1 and reference voltage signal Vref1, to generate switching control signal for controlling the on/off state of the first switch S1 and the second switch S2, so that the DC voltage signal does not exceed the preset voltage value.

As shown from the circuit in FIG. 2, during a normal operation of the contactless power transmission device, the first switch and the second switch remain "off". The equivalent capacitance of impedance matching network and inductance of the receiving coil are resonant at the operating frequency of the system, to achieve wireless energy transmission at the maximum efficiency. When the contactless power transmission device is abnormal, the DC voltage signal increases. In the patent application, the on/off operation of the first switch and the second switch is controlled by the overvoltage control circuit to transfer the energy of the receiving coil away by a loop of the receiving coil, the first impedance circuit and the switch protection circuit, reduce the DC voltage and recover to below the preset voltage value.

Figure 3:
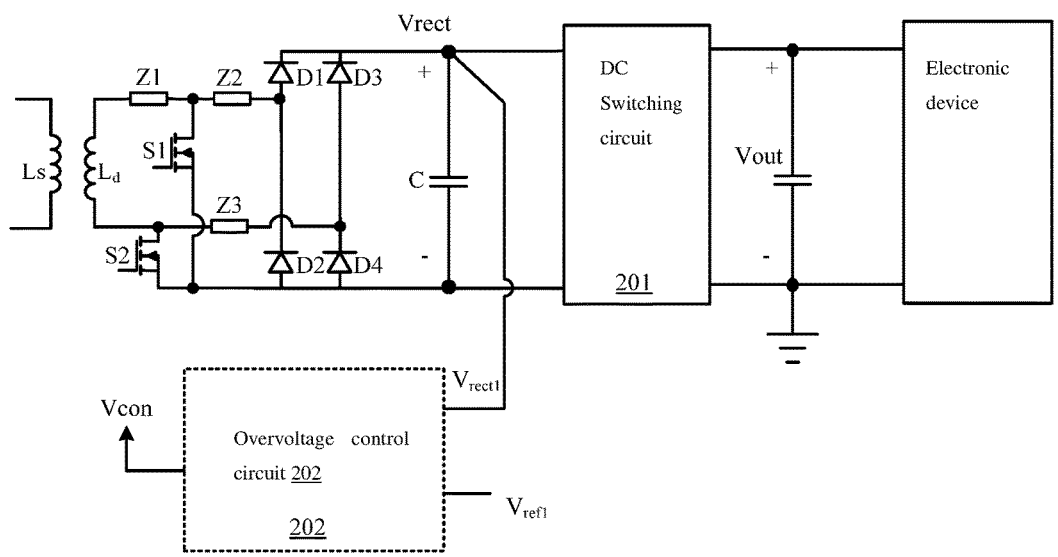
FIG. 3 illustrates a block diagram of a specific embodiment of a contactless power transmission device according to a second embodiment of the patent application.

FIG. 3 shows the circuit block diagram of a specific embodiment of a contactless power transmission device in the patent application. In this embodiment, the rectifier filter circuit, the voltage conversion circuit, the switching protection circuit and overvoltage control circuit are the same with those in FIG. 2. However, in the present embodiment, the impedance matching network further comprises a third impedance circuit Z3. The third impedance circuit Z3 is connected in series between a second end of the receiving coil and the rectifier filter circuit. A first polarity terminal of the second switch is connected to the common connection point of a second end of the receiving coil and the rectifier filter circuit.

Compared with the embodiment shown in FIG. 2, the present embodiment employs three impedance matching circuits such that the first switch S1 suffers a relatively reduced pressure, reducing the cost of the switch.

Figure 4:
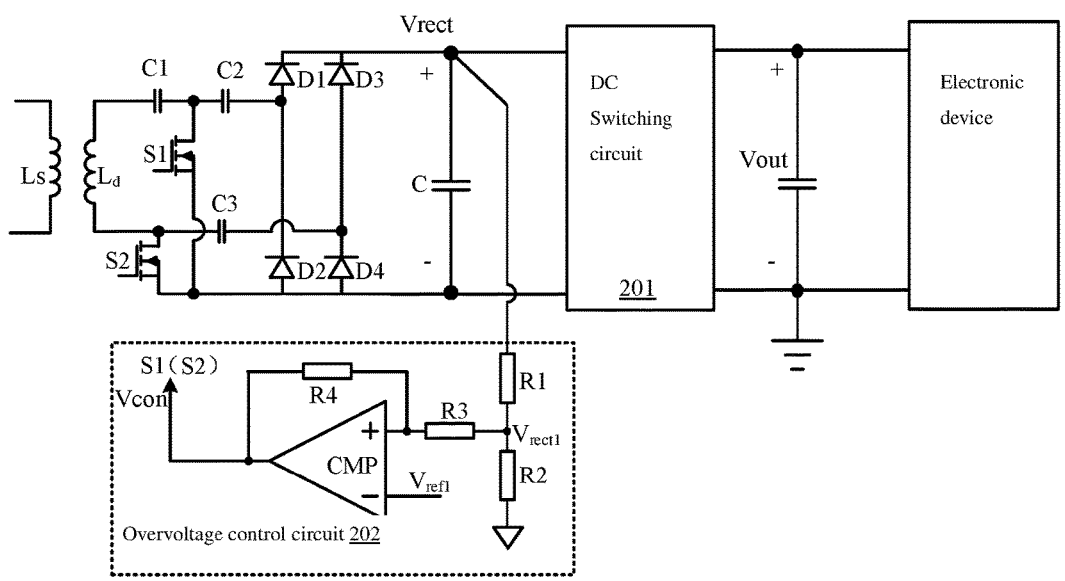
FIG. 4 illustrates a circuit diagram of the embodiment shown in FIG. 3.

FIG. 4 illustrates a circuit diagram of the embodiment shown in FIG. 3. The specific implementation way of the impedance matching network and the overvoltage control circuit is adopted. Referring to FIG. 4, the first impedance circuit, second impedance circuit and third impedance circuit are the first capacitor C1, second capacitor C2 and third capacitor C3 respectively. The first polarity terminal of the first switch S1 is connected to the common connection point of the first capacitor C1 and the second capacitor C2. The first polarity terminal of the second switch S2 is connected to the common connection point of the second end of the receiving coil and the third capacitor C3. Accordingly, the capacitances of the first capacitor C1, second capacitor C2 and third capacitor C3 are set at appropriate values, so that the wireless transmission can achieve the highest energy efficiency during working. For example, during a normal operation of the contactless power transmission device, the equivalent capacitance of first capacitor, second capacitor and third capacitor connected in series is resonant with the equivalent inductance of the receiving coil, and the resonant frequency is consistent with the operating frequency of the system.

In the present embodiment, the first impedance circuit and the second impedance circuit are connected in series between the first end of the receiving coil and rectifier filter circuit. The third impedance circuit is connected in series between the second end of the receiving coil and the rectifier filter circuit. It should be easily understood that the implementation of the impedance circuit has other different combinations. For example, two or more impedance circuits can be connected in series between the first and second ends of the receiving coil and the rectifier filter circuit as long as equivalent capacitance of the impedance matching network is resonant with the equivalent inductance of the receiving coil, and the resonant frequency is consistent with the operating frequency of the system. When the number of capacitors in the first impedance circuit and the second impedance circuit changes, the positions of connection of polarity terminals of the first switch and the second switch change accordingly. For example, when two capacitors are connected in series between the first and second ends of the receiving coil and the rectifier filter circuit respectively, the first switch and the second switch are connected to the common connection point of two capacitors separately. The person skilled in the art should be aware that, there are a variety of combination ways and corresponding connection ways for the impedance matching network and the switch protection circuit under the guidance of the patent application, and any modifications, alterations and replacements within the spirit of the patent application shall fall within the scope of protection of the patent application.

In the embodiment, the capacitors are used as an example of impedance circuit. The person skilled in the art should be aware that, impedance circuit may be inductors, capacitors, resistors and other components alone or in combination thereof, provided that the above resonance requirements are met.

Referring to FIG. 4, the overvoltage control circuit 202 specially includes a sampling circuit and a hysteresis comparator. The sampling circuit includes divider resistors R1 and R2, and the hysteresis comparator includes a resistor R3, a resistor R4 and a comparator CMP. The divider resistors R1 and R2 sample the DC voltage signal Vrect, to obtain a sampling voltage signal Vrect1. The forward input terminal of hysteresis comparator receives the sampling voltage signal Vrect1. The inverting input terminal receives the reference voltage signal Vref1 that represents the preset voltage value, and outputs the switching control signal Vcon. The switching control signal controls the simultaneous switching-on or switching-off of the first switch S1 and the second switch S2.

Figure 5:
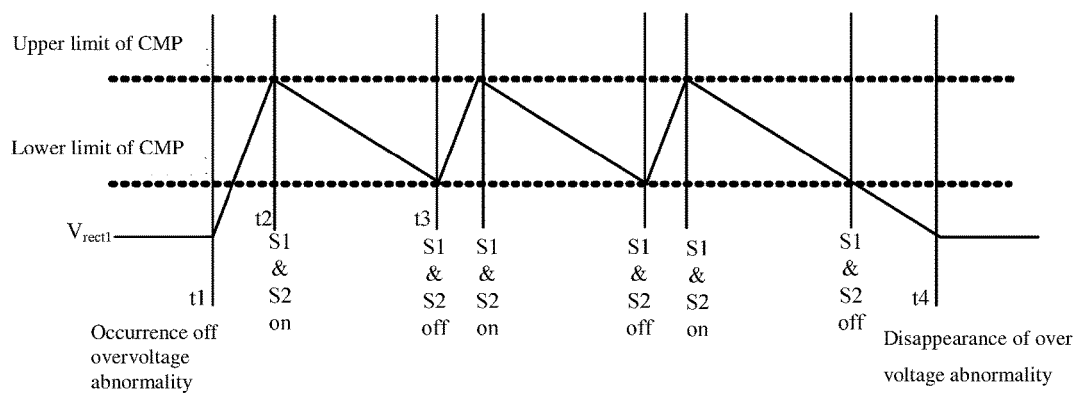
FIG. 5 illustrates an operation waveform graph of the circuit in FIG. 3.

The overvoltage protection operation is illustrated according to the waveform diagram shown in FIG. 5. At the time t1, the external conditions change, resulting in abnormal DC voltage signal and rising continuously. At the time t2, when the sampling voltage signal Vrect1 is detected to higher than the upper limit of voltage of the hysteresis comparator. it represents that the DC voltage signal exceeds the preset value. At this time, the switching control signal output from the comparator CMP is in active state (for example, a high level is indicated as the active state, and the low level is indicated as the inactive state). The first switch S1 and the second switch S2 are simultaneously turned on. The receiving coil Ld, the first capacitor C1, the first switch S1 and the second switch S2 form a current loop. At this time, since the first capacitor C1 and the equivalent inductance of the receiving coil cannot generate resonance, the energy transmitted from the receiving coil will dramatically reduce, and the current in the current loop is not high, and the energy output from the receiving coil will not be transmitted to the rectifier filter circuit, and the DC voltage signal Vrect begins to decline. At the time t3, when the sampling voltage signal Vrect1 is less than the lower limit of voltage of the hysteresis comparator, the switching control signal becomes inactive state, to control the simultaneous switching-off of the first switch S1 and the second switch S2. The energy of receiving coil is transmitted to the rectifier filter circuit again, and if the abnormal circumstances still exists, DC voltage signal Vrect will continue to rise until the upper limit of voltage of the hysteresis comparator. The first switch S1 and the second switch S2 are turned on, the DC voltage signal Vrect decline, and the process repeats, until the abnormal circumstance of the circuit is eliminated at time t4. The DC voltage signal Vrect declines to the value not higher than the preset voltage.

As can be seen from the above process, when the exceptions of the contactless power transmission device occur, the output voltage increases, which will cause damage to the voltage conversion circuit or the electronic device. Thus, in the patent application, to prevent damage to the post-stage circuit, over-voltage protection is performed by detecting the output voltage signal of the rectifier filter circuit. The wireless power transmission device with the overvoltage protection function in the patent application can obtain better and more stable DC voltage signal through the full bridge rectifier circuit. The overvoltage protection switch is connected between the impedance matching network and the ground terminal, which can, on one hand, guarantee no damage to the diodes of the rectifier bridge when the switch is on, and on the other hand, can release the energy of the receiving coil through the loop composed of switch protection circuit.

In order to guarantee the safety of the first switch and the second switch, the capacitances of the first capacitance capacitor, second capacitor and third capacitor should be at an appropriate proportion. It, on one hand, can make the resonant frequency of the receiving portion consistent with the operating frequency of the system during a normal operation of the contactless power transmission device, and on the other hand, the current passing through the first switch and the second switch is not too large when the first switch and the second switch are turned on, or when the first switch and the second switch are turned off, the voltage on both ends of the first switch and the second switch is not too large, to avoid damage to the switching tube.

It should be noted that the overvoltage control circuit on the above embodiment is achieved through the analog circuit composed of comparator. The person skilled in the art should be aware that, the overvoltage control circuit can be achieved by the digital control method without departing the spirit of the patent application, for example, receiving the sampling voltage signal Vrect1 for digital conversion, then, comparing the converted digital voltage signal with the first reference voltage signal and the second reference voltage signal respectively, to obtain the switching control signal. Any substitutions and modifications within the scope of the concept of the patent application shall fall within the scope of the protection of the patent application.

Finally, the patent application discloses a contactless power transmission method applied to contactless power transmission devices. The contactless power transmission device includes a transmitting portion and a receiving portion isolated. The transmitting portion includes a transmitting coil for emitting energy. The receiving portion includes a receiving coil for receiving energy, an impedance matching network, and a rectifier filter circuit connected to the receiving coil sequentially. The method includes the following steps: receiving high-frequency AC output from the receiving coil, to obtain DC voltage signal; and detecting the value of DC voltage signal, when the DC voltage signal is greater than the preset voltage value, controlling the energy of the receiving coil via the switch protection circuit composed of the first switch and the second switch, so that the energy will not flow to the rectifier filter circuit until the DC voltage signal does not exceed the preset voltage value.

The impedance matching network includes a first impedance circuit and a second impedance circuit. The first impedance circuit and the second impedance circuit are connected in series between the first end of the receiving coil and the rectifier filter circuit.

The first polarity terminal of the first switch is connected to a common connection point of the first impedance circuit and the second impedance circuit, the second polarity terminal is connected to a common connection point of a second end of the receiving coil and the rectifier filter circuit, and the second polarity terminal is connected to the ground.

Further, the impedance matching network further comprises a third impedance circuit, the third impedance circuit is connected in series between the second end of the receiving coil and the rectifier filter circuit. The first polarity terminal of the second switch is connected to a common connection point of the second end of the receiving coil and the third impedance circuit.

Further, the on/off operation of the first switch and the second switch is controlled by a switching control signal, the generation of the switching control signal includes the following steps: sampling the DC voltage signal, to obtain sampling voltage signal; and receiving the sampling voltage signal and the reference voltage signal representing the preset voltage value, performing hysteresis comparison, to output the switching control signal.

When the sampling voltage signal is greater than the upper limit of voltage of the hysteresis comparator, the switching control signal is in an active state to control simultaneous switching-on of the first switch and the second switch. When the sampling voltage signal is less than the lower limit of voltage of the hysteresis comparator, the switching control signal is in an inactive state to control the simultaneous switching-off of the first switch and the second switch.

Further, the rectifier filter circuit includes a full bridge rectifier circuit and a filter capacitor. The full bridge rectifier circuit receives high-frequency AC of the receiving coil, to convert to half-sinusoid voltage signal. The filter capacitor receives the half-sinusoid voltage signal, to obtain DC voltage signal.

Further, the equivalent capacitance of the impedance matching network is resonant with the equivalent inductance of the receiving coil, and the resonant frequency is consistent with the operating frequency of the system during a normal operation of the contactless power transmission device.

The contactless power transmission device and the power transmission method in the patent application can solve the overvoltage problem under the condition of full-bridge rectifier, and it is easy to control, with good effect.

The contactless power transmission device and power transmission in the preferred embodiments are described in details. Those persons skilled in the art can extrapolate to other techniques or structures and circuit layout and elements that can be used in the aforesaid embodiments.

The above embodiments do not describe all details nor limit the patent application. Apparently, many modifications and variations can be made according to the above descriptions. These embodiments in the patent application are to explain the principle and actual application of the patent application, so that the person skilled in the art can make good use of the patent application or modify to use them. The patent application is limited only by the claims and their full scope and equivalents.

What is claimed is:

1. A contactless power transmission device, comprising:
a transmitting portion; and
a receiving portion,
wherein the transmitting portion and the receiving portion are isolated; the transmitting portion comprises a transmitting coil for emitting energy, the receiving portion comprises a receiving coil for receiving energy, an impedance matching network, a rectifier filter circuit and a voltage conversion circuit connected to the receiving coil sequentially,
wherein
the receiving portion further comprises a switch protection circuit and an overvoltage control circuit;
the impedance matching network comprises a first impedance circuit and a second impedance circuit, the first impedance circuit and the second impedance circuit are connected between a first end of the receiving coil and the rectifier filter circuit;
the rectifier filter circuit receives the high-frequency AC output from the receiving coil, to obtain a DC voltage signal;
the switch protection circuit comprises a first switch and a second switch, a first polarity terminal of the first switch is connected to a common connection point of the first impedance circuit and the second impedance circuit, a second polarity terminal first switch is connected to a ground, a first polarity terminal of the second switch is connected to the a common connection point of a second end of the receiving coil and the rectifier filter circuit, and a second polarity terminal second switch is connected to the ground; and
the overvoltage control circuit receives the DC voltage signal and a reference voltage signal, to generate a switching control signal for controlling an on/off state of the first switch and the second switch, so that the DC voltage signal does not exceed a preset voltage value.

2. The contactless power transmission device according to claim 1, wherein the rectifier filter circuit comprises a full bridge rectifier circuit and a filter capacitor, the full bridge rectifier circuit receives high-frequency AC of the receiving coil, to convert to a half-sinusoid voltage signal, the filter capacitor receives the half-sinusoid voltage signal, to obtain a DC voltage signal.

3. The contactless power transmission device according to claim 2, wherein the full bridge rectifier circuit comprises a first diode and a second diode connected in series and a third diode and a fourth diode connected in series, and the two pairs of diodes connected in series are connected in parallel, and a common connection terminal of the first diode and the third diode outputs the half-sinusoid voltage signal;
    a common connection terminal of the second diode and the fourth diode is connected to the ground;
    the second impedance circuit is connected to a common connection point of the first diode and the second diode.

4. The contactless power transmission device according to claim 3, wherein the impedance matching network further comprises a third impedance circuit, the third impedance circuit is connected in series between the second end of the receiving coil and the rectifier filter circuit; and
    the first polarity terminal of the second switch is connected to a common connection point of the second end of the receiving coil and the third impedance circuit.

5. The contactless power transmission device according to claim 4, wherein the third impedance circuit is connected to a common connection point of the third diode and the fourth diode.

6. The contactless power transmission device according to claim 4, wherein
    the first impedance circuit, second impedance circuit and third impedance circuit are a first capacitor, a second capacitor and a third capacitor respectively; and
    during a normal operation of the contactless power transmission device, an equivalent capacitance of the first capacitor, the second capacitor and third capacitor connected in series is resonant with an equivalent inductance of the receiving coil, and a resonant frequency of the equivalent capacitance and the equivalent inductance is consistent with an operating frequency of the system.

7. The contactless power transmission device according to claim 4, wherein
    the overvoltage control circuit specifically comprises a sampling circuit and a hysteresis comparator,
    the sampling circuit samples the DC voltage signal, to obtain a sampling voltage signal;
    the hysteresis comparator receives the sampling voltage signal and the reference voltage signal representing the preset voltage value, and outputs the switching control signal; and
    when the sampling voltage signal is greater than an upper limit of voltage of the hysteresis comparator, the switching control signal is in an active state to control the first switch and the second switch to switch on simultaneously; when the sampling voltage signal is less than a lower limit of voltage of the hysteresis comparator, the switching control signal is in an inactive state to control the first switch and the second switch to switch off simultaneously.

8. The contactless power transmission device according to claim 1, wherein
    the first impedance circuit and second impedance circuit are a first capacitor and a second capacitor respectively; and
    during a normal operation of the contactless power transmission device, an equivalent capacitance of the first capacitor and second capacitor connected in series is resonant with an equivalent inductance of the receiving coil, and a resonant frequency of the equivalent capacitance and the equivalent inductance is consistent with an operating frequency of the system.

9. The contactless power transmission device according to claim 1, wherein the voltage conversion circuit receives a DC voltage signal transmitted from rectifier filter circuit, and outputs an appropriate voltage to an electronic device by converting a DC voltage.

10. The contactless power transmission device according to claim 1, wherein both the first switch and the second switch are field-effect transistors.

11. The contactless power transmission device according to claim 1, wherein
    the overvoltage control circuit specifically comprises a sampling circuit and a hysteresis comparator,
    the sampling circuit samples the DC voltage signal, to obtain a sampling voltage signal;
    the hysteresis comparator receives the sampling voltage signal and the reference voltage signal representing the preset voltage value, and outputs the switching control signal; and
    when the sampling voltage signal is greater than an upper limit of voltage of the hysteresis comparator, the switching control signal is in an active state to control the first switch and the second switch to switch on simultaneously; when the sampling voltage signal is less than a lower limit of voltage of the hysteresis comparator, the switching control signal is in an inactive state to control the first switch and the second switch to switch off simultaneously.

12. A contactless power transmission method which is applied to a contactless power transmission device, comprising:
    receiving a high-frequency AC output from a receiving coil, to obtain a DC voltage signal;
    detecting a value of the DC voltage signal, wherein when the DC voltage signal is greater than a preset voltage value, controlling an energy of a receiving coil via a switch protection circuit, so that the energy will not flow to a rectifier filter circuit until the DC voltage signal does not exceed the preset voltage value, the switch protection circuit comprises a first switch and a second switch;
    wherein the contactless power transmission device comprises a transmitting portion and a receiving portion isolated, the transmitting portion comprises the transmitting coil for emitting energy, the receiving portion comprises the receiving coil for receiving energy, an impedance matching network, and the rectifier filter circuit connected to the receiving coil sequentially;
    wherein the impedance matching network comprises a first impedance circuit and a second impedance circuit, the first impedance circuit and the second impedance circuit are connected in series between a first end of the receiving coil and the rectifier filter circuit; and
    a first polarity terminal of the first switch is connected to a common connection point of the first impedance circuit and the second impedance circuit, a second polarity terminal of the first switch is connected to a ground, a first polarity terminal of the second switch is connected to the a common connection point of a second end of the receiving coil and the rectifier filter circuit, and a second polarity terminal of the second switch is connected to the ground.

13. The contactless power transmission method according to claim 12, wherein
    the impedance matching network further comprises a third impedance circuit, the third impedance circuit is connected in series between the second end of the receiving coil and the rectifier filter circuit; and
    the first polarity terminal of the second switch is connected to a common connection point of the second end of the receiving coil and the third impedance circuit.

14. The contactless power transmission method according to claim 13, wherein an on/off operation of the first switch and the second switch is controlled by a switching control signal, the switching control signal is generated by:

sampling a DC voltage signal, to obtain a sampling voltage signal;

receiving the sampling voltage signal and a reference voltage signal representing the preset voltage value, performing hysteresis comparison, to output the switching control signal; and when the sampling voltage signal is greater than an upper limit of voltage of the hysteresis comparator, the switching control signal is in an active state to control simultaneous switching-on of the first switch and the second switch; when the sampling voltage signal is less than a lower limit of voltage of the hysteresis comparator, the switching control signal is in an inactive state to control the simultaneous switching-off of the first switch and the second switch.

15. The contactless power transmission method according to claim 13, wherein the rectifier filter circuit comprises a full bridge rectifier circuit and a filter capacitor, the full bridge rectifier circuit receives high-frequency AC of the receiving coil, to convert to a half-sinusoid voltage signal, the filter capacitor receives the half-sinusoid voltage signal, to obtain a DC voltage signal.

16. The contactless power transmission method according to claim 12, wherein an equivalent capacitance of the impedance matching network is resonant with a equivalent inductance of the receiving coil, and a resonant frequency is consistent with an operating frequency of the system, during a normal operation of the contactless power transmission device.

17. The contactless power transmission method according to claim 12, wherein an on/off operation of the first switch and the second switch is controlled by a switching control signal, the switching control signal is generated by:

sampling a DC voltage signal, to obtain a sampling voltage signal;

receiving the sampling voltage signal and a reference voltage signal representing the preset voltage value, performing hysteresis comparison, to output the switching control signal; and when the sampling voltage signal is greater than an upper limit of voltage of the hysteresis comparator, the switching control signal is in an active state to control simultaneous switching-on of the first switch and the second switch; when the sampling voltage signal is less than a lower limit of voltage of the hysteresis comparator, the switching control signal is in an inactive state to control the simultaneous switching-off of the first switch and the second switch.

18. The contactless power transmission method according to claim 12, wherein the rectifier filter circuit comprises a full bridge rectifier circuit and a filter capacitor, the full bridge rectifier circuit receives high-frequency AC of the receiving coil, to convert to a half-sinusoid voltage signal, the filter capacitor receives the half-sinusoid voltage signal, to obtain a DC voltage signal.

* * * * *